United States Patent

Babler

[15] 3,641,262

[45] Feb. 8, 1972

[54] SHIFT CONTROL

[72] Inventor: Egon S. Babler, Chicago, Ill.

[73] Assignee: Teletype Corporation, Skokie, Ill.

[22] Filed: Dec. 29, 1969

[21] Appl. No.: 888,732

[52] U.S. Cl. ....................178/25, 197/16

[51] Int. Cl. ....................H04l 15/24, H04l 15/34, H04l 17/16

[58] Field of Search ....................178/25, 26 R; 197/16, 17

[56] References Cited

UNITED STATES PATENTS

| | | | |
|---|---|---|---|
| 3,414,674 | 12/1968 | Arico | 178/25 |
| 3,157,265 | 11/1964 | Palmer | 197/16 |
| 2,034,387 | 3/1936 | Brockman | 197/17 |
| 2,879,876 | 3/1959 | Palmer et al. | 197/16 |
| 3,128,341 | 4/1964 | Madsen | 178/25 |

*Primary Examiner*—Kathleen H. Claffy
*Assistant Examiner*—William A. Helvestine
*Attorney*—J. L. Landis and R. P. Miller

[57] ABSTRACT

A teleprinter for printing indicia on a record medium in response to receipt of permutation signals of coded binary bits and having type elements in a type box with mechanism for two-dimensional positioning of the type box to bring selected-type elements into position for printing. Type box locations that are normally devoid of type elements and corresponding to nonprinting function code combinations are supplied with an additional font of type elements. A portion of the positioning mechanism is code responsively disconnected from received signals to print the additional font in response to received signals corresponding to other printing code combinations.

10 Claims, 3 Drawing Figures

INVENTOR
EGON S. BABLER

BY

ATTORNEY

SHIFT CONTROL

FIELD OF THE INVENTION

This invention relates to code-signal-responsive printing apparatus and more particularly to a shift control for printing apparatus responding to a plurality of received signals to cause the apparatus to print other than the normal font of characters in order to pring an additional font.

BACKGROUND OF THE INVENTION

In the field of data communications, to which the present invention is most readily adapted, signals in the form of groups of binary data bits are received over a data communications channel. In response to receipt of these groups of binary bits (called code combinations), a teleprinting apparatus prints indicia in the form of alphanumeric characters or other figures on a page of paper or other record medium.

In such a teleprinting apparatus, the signals received from the data communications channels are used to position a plurality of code bars, on a one-to-one relationship, to either one or the other of their axial extreme positions. The positions of the several code bars control the typing apparatus of the page-width teleprinter, causing the typing apparatus to print the indicia on the paper.

In addition, modern teleprinters contain apparatus for sensing the axial positions of the code bars in order to recognize receipt of selected code combinations other than those normally associated with printing indicia. Such other nonprinting code combinations are called "function" code combinations or "function" characters and are recognized in an apparatus which is known in the data communications art as a "stunt box." A stunt box produces a mechanical movement of a predetermined lever in response to recognition of a predetermined function code combination. These mechanical movements are put to many varied uses. A stunt box for producing mechanical movements is shown and described in U.S. Pat. No. 2,666,095, granted to W. J. Zenner on Jan. 12, 1969.

A teleprinter such as the above is shown and described in U.S. Pat. No. 2,505,729, granted on Apr. 25, 1950, to W. J. Zenner. In this latter patent, a plurality of type elements are mounted in locations that are arranged in columns and rows in a type carrier frame called a "type box." A vertical positioning mechanism is provided to move the type box in the vertical direction in order to place a selected row of type elements in the printing position. A horizontal positioning mechanism is provided to place a selected column of type elements in the printing position. The selected column and selected row intersect at the selected type element. The combination of these orthogonal movements places the selected type element in the printing position. A print hammer at the printing position drives the selected type element into the record medium to print in indicium thereon.

A spacing mechanism advances the type box and print hammer to the right after each printing operation. The type box movement caused by the spacing mechanism and the type box movement caused by the horizontal positioning mechanism are superimposed on one another to control the actual horizontal position of the type box.

If a nonprinting function code combination is recognized by the stunt box, operation of the print hammer can be suppressed. Or, the type box location corresponding to that function code combination can be devoid of a type element.

In binary counting, a magnitude is represented by a series of binary digits, with each digit having a significance double the significance one adjacent digit and one-half the significance of the other adjacent digit. An aggregate motion mechanism is a mechanical implementation of this binary counting principle. Such mechanisms are known in the teleprinter art to be well suited to positioning type carriers in response to received binary code combinations. Each binary bit has a significance according to its location in the code combination. Typically, eccentric cams are moved from one extreme to the other by two-stop clutches, each of which is controlled by one of the bits of the received code combination. A suitable leverage system combines the outputs from the individual cam followers to move the type carrier.

Aggregate motion mechanisms can be used as the horizontal and vertical positioning mechanisms of the above-mentioned Zenner U.S. Pat. No. 2,505,729. U.S. Pat. No. 3,456,078, granted to L. A. Nash on July 15, 1969, shows and describes a vertical aggregate motion type box positioning mechanism for a teleprinter. In the above-mentioned Nash patent, the inputs to the aggregate motion mechanism are provided by eccentricities mounted on the driven members of a plurality of two-position or two-stop clutches which are controlled by input telegraph signals by means of code bars.

Codes have been devised to exploit such mechanisms. One such code is the American Standard Code for Information Interchange (ASCII).

It is an object of the present invention selectively to print a font of alphanumeric indicia upon receipt of signals normally associated with a different font of indicia.

It is another object of the present invention selectively to disable one element of the type positioning mechanism of a printing apparatus.

It is still another object of the present invention selectively to establish and disestablish a driving relationship between a driving element and a driven element and to hold the driven element fixed upon the disestablishment of the driving relationship.

SUMMARY OF THE INVENTION

In accordance with the present invention, a code responsive teleprinter is arranged to disengage and lock a portion of the printing means to permit the printing means to print a font of indicia other than the font normally associated with the code combinations subsequently received.

BRIEF DESCRIPTION OF THE DRAWING

The present invention will be more readily understood by referring to the following detailed description in conjunction with the accompanying drawings wherein.

DETAILED DESCRIPTION

Figure 1:
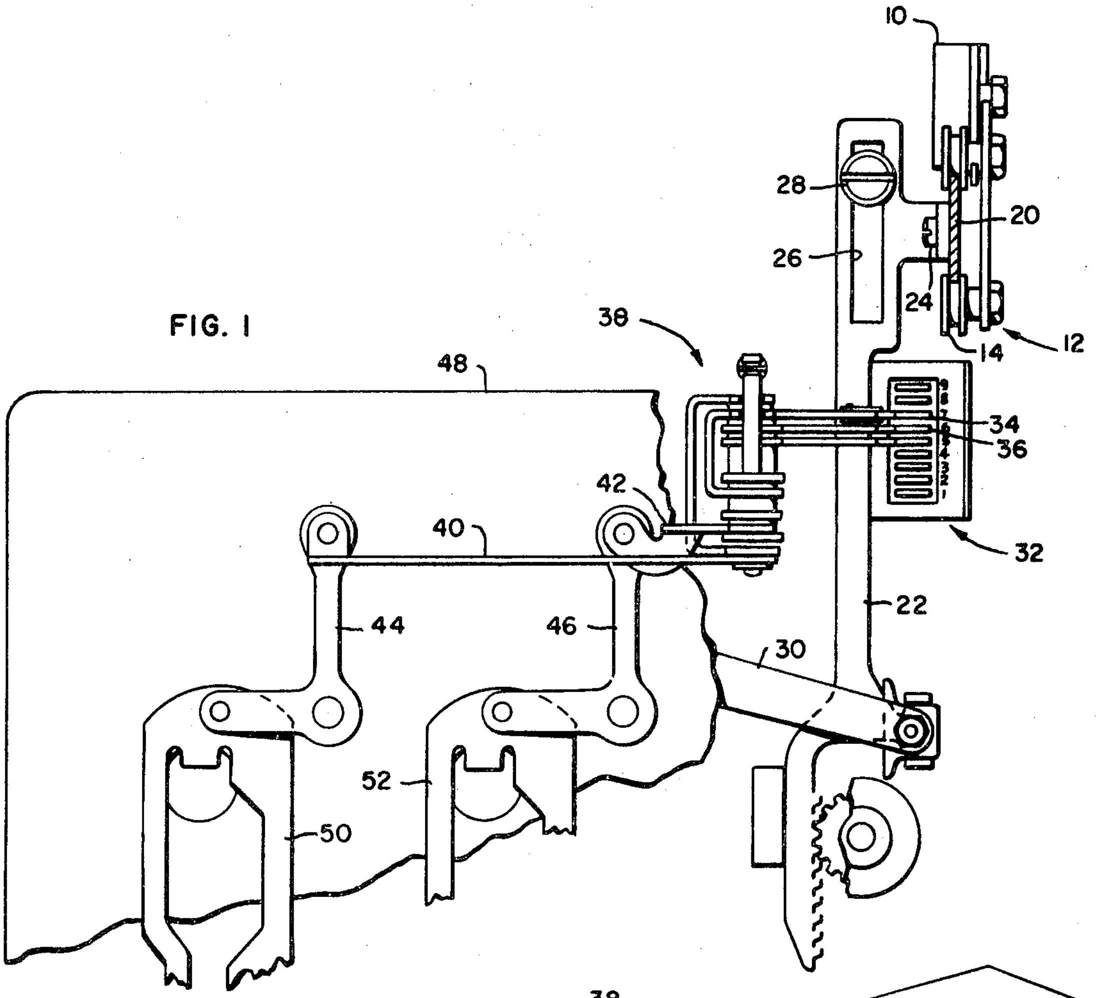
FIG. 1 is a side view of the vertical positioning mechanism of a type carrier for an aggregate motion printing machine which responds to the axial positioning of a plurality of code bars.

Referring now to the drawings and more particularly to FIG. 1, there is shown a vertical positioning mechanism for a teleprinter, similar in many respects to the mechanism shown in the above-mentioned Nash patent. A type box 10 is mounted on a frame 12 having a plurality of rollers 14. A horizontal positioning mechanism (not shown) is connected to the frame 12 in such a way as to effect horizontal positioning of the type box 10.

The frame 12 is rollably mounted on a horizontal rail 20 so that the rollers 14 constrain the frame 12 and the type box 10 in the vertical direction, to assume positions controlled by the vertical position of the rail 20. The rail 20 is firmly fixed by suitable fasteners 24 to a vertical slide 22 having a slot 26 surrounding a fixed guide member 28 that constrains the slide 22 to move only in the vertical direction. The vertical slide 22 is fastened to an operating lever 30 for vertical motion that is the output element of the aggregate motion mechanism of the Nash patent.

In that aggregate motion mechanism, each one of the code bars 32 of the teleprinter assumes one or the other of its axial extreme positions in response to its associated bit of the received code combination. The code bars 34 and 36 that are associated with the vertical positioning of the type box 10 are connected to two clutch slides 40 and 42, respectively, by means of a bellcrank system 38. The clutch slides 40 and 42 are rotatably connected to two clutch bellcranks 44 and 46, respectively. These clutch bellcranks are rotatably mounted on a frame member 48 of the teleprinter. The clutch bellcranks are also rotatably connected to two clutch stop members 50 and 52.

When the code bars 34 and 36 assume one or the other of their axial extreme positions, the clutch stop members 50 and 52, respectively, assume their associated extreme positions, thereby controlling the position of the vertical lever 30 as shown in the above-mentioned Nash patent.

SHIFT MECHANISM

Figure 2:
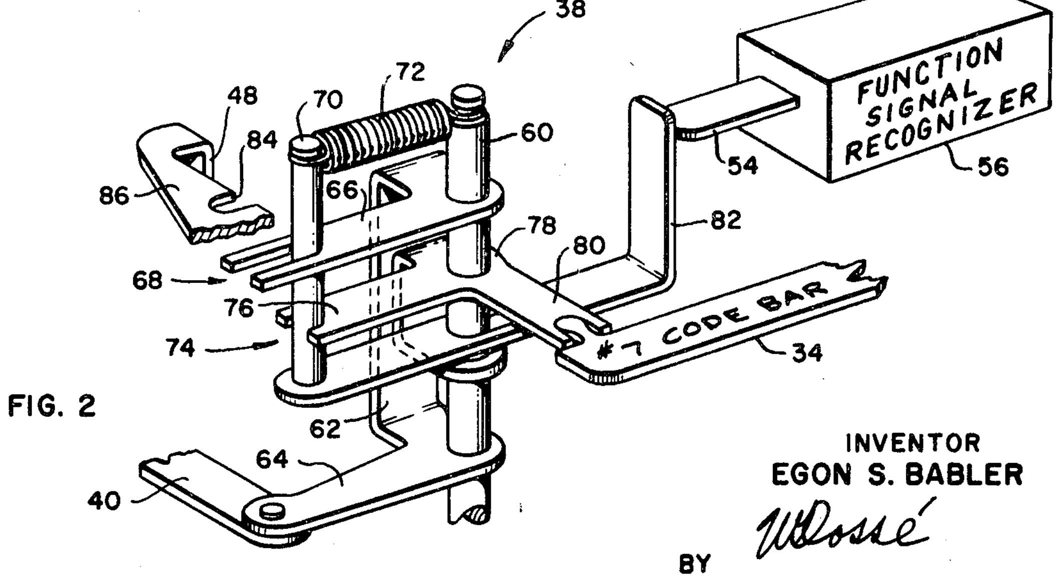
FIG. 2 is a linear clutch mechanism which responds to the recognition of function signals present in the permutative positions of the code bars to disengage a code bar from the vertical positioning mechanism.

Referring now to FIG. 2 of the drawing, the bellcrank system 38 is shown in greater detail, together with an output lever 54 from a function signal recognizer 56 (stunt box) shown in block form only. The bellcrank system 38 is mounted on a fixed axis post 60. The clutch slide 40 is shown connected to a three-dimensional bellcrank 62 which is rotatably mounted at two places on the axis post 60. One arm 64 of the bellcrank 62 is rotatably connected to the clutch slide 40. The other arm 66 of the bellcrank 62 carries a forked end portion 68. The bellcrank 62 is driven by a coupling pin 70 which is normally biased by a spring 72 into engagement with the forked end 68 of the bellcrank 62 and also with a forked end 74 of an arm 76 of another bellcrank 78, which is also rotatably mounted on axis post 60. One arm 80 of the bellcrank 78 is connected rotatably to the "number 7" code bar 34 of the teleprinter. This code bar responds to the seventh bit of each permutation code combination received and is moved to one or the other of its two axial extreme positions in response to the binary condition of the "number 7" bit of the received code combination. Movement of the code bar 34 to one or the other of its extreme positions causes the bellcrank 78 to drive the bellcrank 62 to one or the other of two extreme positions and thereby move the clutch slide 40 to one or the other of its two extreme positions. The two extreme positions of the code bar 34 and the clutch slide 40 are called the "0" position ("space"—in telegraphy) and the "1" position ("-mark"—in telegraphy). The printing apparatus of the teleprinter responds to all received code combinations to position the type box 10, whether these code combinations are printing code combinations, or nonprinting code combinations. However, upon receipt of a nonprinting code combination, the function signal generator 56 suppresses printing.

In response to receipt and recognition by the function signal recognizer 56 of a predetermined shift function, the function signal recognizer 56 moves the output lever 54 to the left (FIG. 2). The output lever 54 moves a coupling slide 82 to the left. The coupling slide 82 carries the coupling pin 70 and moves it to the left against the urging of the bias spring 72.

As the coupling pin 70 moves to the left, it disengages from the forked end 74 of the driving bellcrank 78 and engages a slot 84 cut in an ear 86 of the frame 48 of the teleprinter. When the coupling pin 70 engages the slot 84, it still remains in engagement with the forked end 68 of the driven bellcrank 62.

The predetermined shift function code combination which causes the function signal recognizer 56 to move the output lever 54 to the left contains a "0" in its seventh code level. Therefore, at that time, the code bar 34 is in extreme position corresponding to "0." Consequently, in response to receipt of that predetermined shift function, the clutch slide 40 is locked into its "0" position by the interaction of the coupling pin 70 with the forked end 68 of the bellcrank 62 and the slot 84. At the same time, the bellcrank 62 is disengaged from the bellcrank 78. Therefore, any subsequent code combination that has a "1" in its seventh code level still causes the code bar 34 and the function signal recognizer 56 to respond to that code combination; however, the clutch slide 40 does not respond to that subsequent code combination. Therefore, in response to receipt of the predetermined shift function, the printing apparatus shifts to a different printing mode.

In response to another predetermined unshift function code combination, the function signal recognizer 56 withdraws the output lever 54 to the right. This also occurs when the code bar 34 is in its "0" extreme position. Therefore, the forked end 74 of the driving bellcrank 78 is again aligned with the coupling pin 70. Rightward movement of the output lever 54 permits the coupling slide 82 and the coupling pin 70 to be moved to the right by the spring 72. The driven bellcrank 62 is disengaged from the slot 84, and the pin 70 engages the driven bellcrank 62 with the driving bellcrank 78. Subsequently, the type-box positioning apparatus will again respond to movement of the code bar 34.

FONT CHANGE

Figure 3:
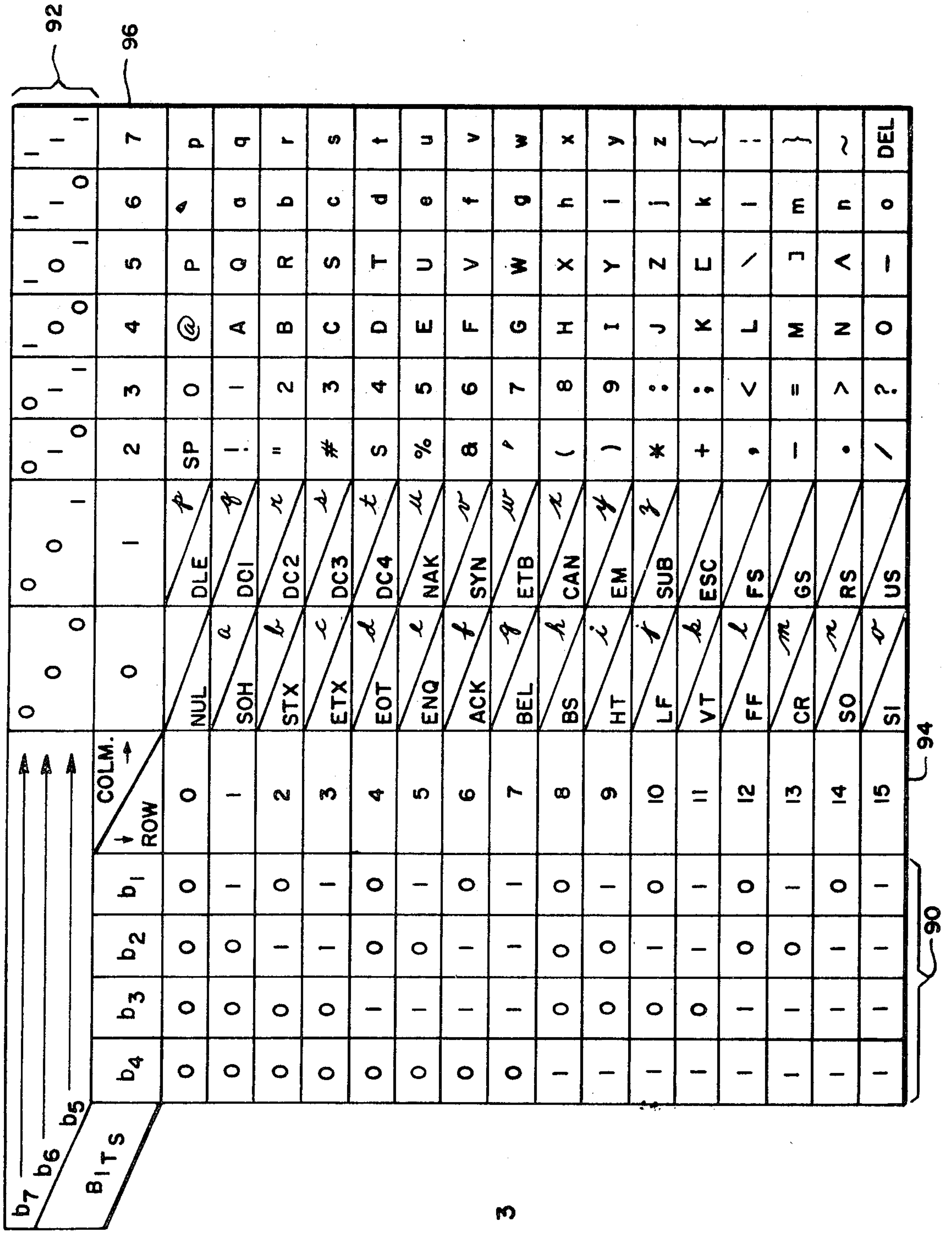
FIG. 3 is a diagram of the American Standard Code for Information Interchange showing that the same code combinations which are recognized for printing one font of characters can, with the disconnecting apparatus of FIG. 2, be used also for printing an additional font of characters.

The results of the shifting function as described above can readily be appreciated by referring to FIG. 3 of the accompanying drawings which show a diagram of the American Standard Code for Information Interchange (ASCII). The seven significant bits of this code are labeled $b_1$ to $b_7$, and they are arranged in four columns 90 and three rows 92 respectively along the left side and top of FIG. 3. The permutations of the four binary bits $b_1$ to $b_4$ yield 16 rows 94 (0–15); and the permutations of the three bits $b_5$ to $b_7$ yield eight columns 96 (0–7), for a total of 128 different code permutations or combinations ($2^7$). Normally, the columns 96 that are numbered "2–7" represent printing code combinations and correspond to type elements in the type box 10. The two columns "0 and 1" of the eight columns 96 represent nonprinting functions and correspond to blank positions on the type box 10. With the apparatus shown in FIGS. 1 and 2, receipt of the nonprinting shift-out function signal SO (which corresponds to a code 0111000) causes the function signal recognizer 56 to move the output lever 54 (FIG. 2) to the left.

In code combination corresponding to the nonprinting function SO, the seventh bit is "0." Therefore, subsequent code combinations received cause the type box 10 to be positioned as though the seventh bit were "0," even though the seventh bit happens to be a "1." Consequently, subsequent transmission of code combinations of columns 4 and 5 of the columns 96 in the chart of FIG. 3 will not print the capital letters shown in columns 4 and 5. Instead, these code combinations will cause the teleprinter to print some other font of characters of miscellaneous symbols that have been placed in the normally void type element locations of the type box 10. These are the type box locations that correspond to the nonprinting functions of columns 0 and 1 of the column 96. As shown in FIG. 3, these could be lower case script letters which can then be printed upon receipt of codes normally associated with the block capital letters in columns 4 and 5, instead of printing the block capital letters. The figures in columns 2 and 3 can still be printed because the seventh bit is a "0." Receipt of code combinations associated with the lowercase block letters of columns 6 and 7 will cause figures from columns 2 and 3 to be printed.

This improved apparatus permits the use of normally blank portions of the type box 10 to print another font of characters. However, these additional characters will not be printed spuriously upon receipt of a function code combination because printing is suppressed when a function code combination is received.

Receipt of the nonprinting shift-in function signal SI, which corresponds to a code combination 111000, causes the function signal recognizer 56 to withdraw the output lever 54 (FIG. 2) to the right. This moves this coupling pin 70 into engagement with the forked end 74 of the bellcrank 78. Therefore, the printing apparatus now again responds to the seventh code bar 34.

While one specific embodiment of the invention has been described in detail, it will be obvious that various modifications may be made from the specific details described without departing from the spirit and scope of the invention.

I claim:

1. An apparatus for converting permutation-coded signals into function signals and visible indicia having: code bars, the axial positions of which represent the coded signals; printing means responsive to the axial positions of the code bars for printing visible indicia; and means for recognizing permutative positions of the code bars representative of function signals and for issuing at least one function signal in response thereto, wherein the improvement comprises:

means responsive to a predetermined function signal for selectively disengaging at least a portion of the printing means from the code bars; and means for latching said portion of the printing means during a period of disengagement.

2. An improved apparatus for converting permutation-coded signals into function signals and visible indicia having: code bars, the axial positions of which represent the coded signals; printing means responsive to the axial positions of the code bars for printing visible indicia; and means for recognizing permutative positions of the code bars, representative of function signals and for issuing at least one function signal in response thereto, wherein the improvement comprises:

a driving bellcrank, one arm of which is rotatably connected to one of the code bars, the other arm of which has a forked end;

a driven bellcrank pivoted coaxially with the driving bellcrank, one arm of which is rotatably connected to the portion of the printing means, the other arm of which has a forked end;

a coupling pin normally positioned in engagement with the forked end of the other arm of the driving bellcrank and the forked end of the other arm of the driven bellcrank;

means responsive to received signals for selectively removing the coupling pin from engagement with the forked end of the other arm of the driving bellcrank but not from engagement with the forked end of the other arm of the driven bellcrank; and means for latching said portion of the printing means during a period of disengagement.

3. An apparatus according to claim 2 wherein the latching means comprises a stationary member having an opening for engagement by the coupling pin upon disengagement of the coupling pin from the forked end of the other arm of the driving member.

4. An improved apparatus for converting permutation-coded signals into function signals and visible indicia having; code bars, the axial positions of which represent the coded signals; printing means responsive to the axial positions of the code bars for printing visible indicia; and means for recognizing permutative positions of the code bars, representative of function signals and for issuing at least one function signal in response thereto, wherein the improvement comprises:

a coupling member mechanically linking at least one code bar to said portion of the printing means;

function signal recognizing means for removing the coupling member from linking engagement with at least the one code bar; and means for latching said portion of the printing means during a period of disengagement.

5. An apparatus according to claim 4 wherein the coupling member remains in engagement with the portion of the printing means.

6. An apparatus according to claim 5 wherein the latching means comprises means cooperating with the coupling member in the removed condition for immobilizing the portion of the printing means.

7. A method for converting permutation-coded signals into function signals and visible indicia wherein the axial positions of code bars represent the coded signals; a printing apparatus responds to the axial positions of the code bars to print visible indicia; and the permutative positions of code bars, that are representative of function signals, are recognized to generate at least one function signal in response thereto, wherein the improvement comprises:

selectively disengaging at least a portion of the printing apparatus from the code bars in response to a predetermined function signal; and latching said portion of the printing apparatus during a period of disengagement.

8. An improved method for converting permutation-coded signals into function signals and visible indicia wherein the axial positions of code bars represent the coded signals; a printing apparatus responds to the axial positions of the code bars to print visible indicia; the permutative positions of the code bars, that are representative of function signals, are recognized to generate at least one function signal in response thereto, a coupling member in linking engagement with one of the code bars and at least a portion of the printing apparatus and wherein the improvement comprises:

removing the coupling member from linking engagement with at least the one code bar; and latching said portion of the printing apparatus during a period of disengagement.

9. A method according to claim 8 wherein the latching step comprises keeping the coupling member in engagement with the portion of the printing means.

10. A method according to claim 9 wherein the latching step further comprises latching the coupling member in the removed condition for immobilizing the portion of the printing means.

* * * * *